May 21, 1946.  A. R. GRAD  2,400,691
BROACHING MACHINE
Filed Oct. 2, 1944  6 Sheets-Sheet 1

INVENTOR
ADOLF R. GRAD
BY
ATTORNEY

May 21, 1946.   A. R. GRAD   2,400,691
BROACHING MACHINE
Filed Oct. 2, 1944   6 Sheets-Sheet 2
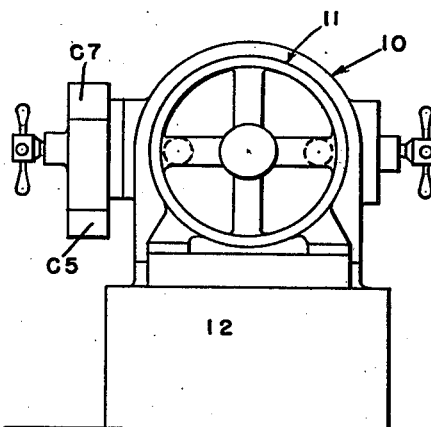
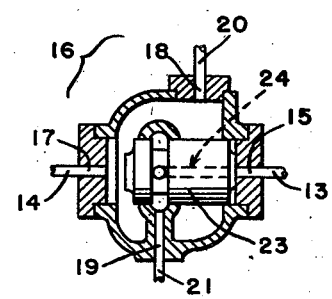
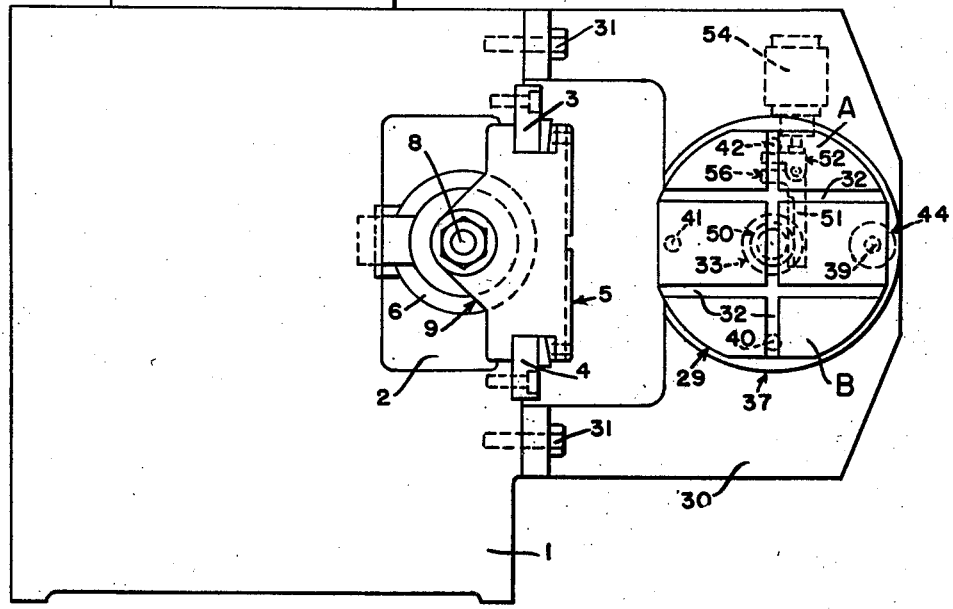
INVENTOR
ADOLF R. GRAD
ATTORNEY

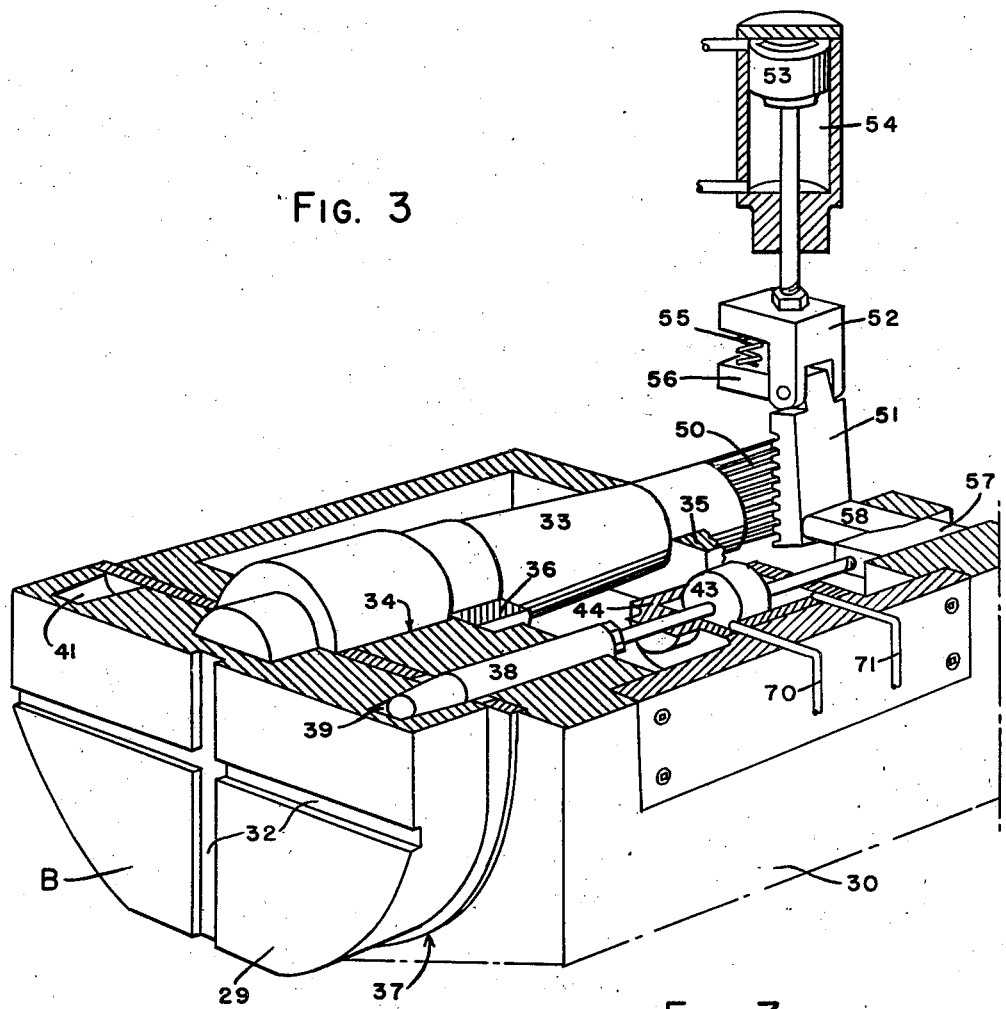

May 21, 1946.  A. R. GRAD  2,400,691
BROACHING MACHINE
Filed Oct. 2, 1944  6 Sheets-Sheet 6

INVENTOR
ADOLF R. GRAD
BY
ATTORNEY

UNITED STATES PATENT OFFICE 2,400,691

BROACHING MACHINE

Adolf R. Grad, Wauwatosa, Wis., assignor to The Oilgear Company, Milwaukee, Wis., a corporation of Wisconsin Application October 2, 1944, Serial No. 556,764

13 Claims. (Cl. 90—33)

This invention relates to machine tools of the type in which a tool is moved in opposite directions to enable it to operate upon work and successive pieces of work are alternately moved into and out of position to be operated upon by the tool, such as a broaching machine in which successive pieces of work are moved into and out of the path of a broaching tool carried by a reciprocable carriage.

Among the objects of the invention are the provision in such a machine of a work support, located at such a height that work pieces may be easily and readily attached thereto by an operator standing upon the floor on which the machine is supported, and means for automatically moving the work pieces into and out of position to be operated upon by the tool.

The invention is exemplified by the machine shown somewhat schematically in the accompanying drawings in which the views are as follows:

Fig. 2 is an end view of the machine looking from the left end of Fig. 1.

Fig. 3 is a perspective view partly in section and somewhat diagrammatic in character illustrating the mechanism for indexing and locking the table which carries the work to be broached, the section being taken along the horizontal centerline of the table and certain parts being broken away or omitted to expose other parts.

Fig. 5 is a view showing a differential valve in a position different from that shown in Fig. 4.

Figs. 6 and 7 are views showing control valves in positions different from those shown in Fig. 4.

Figure 1:
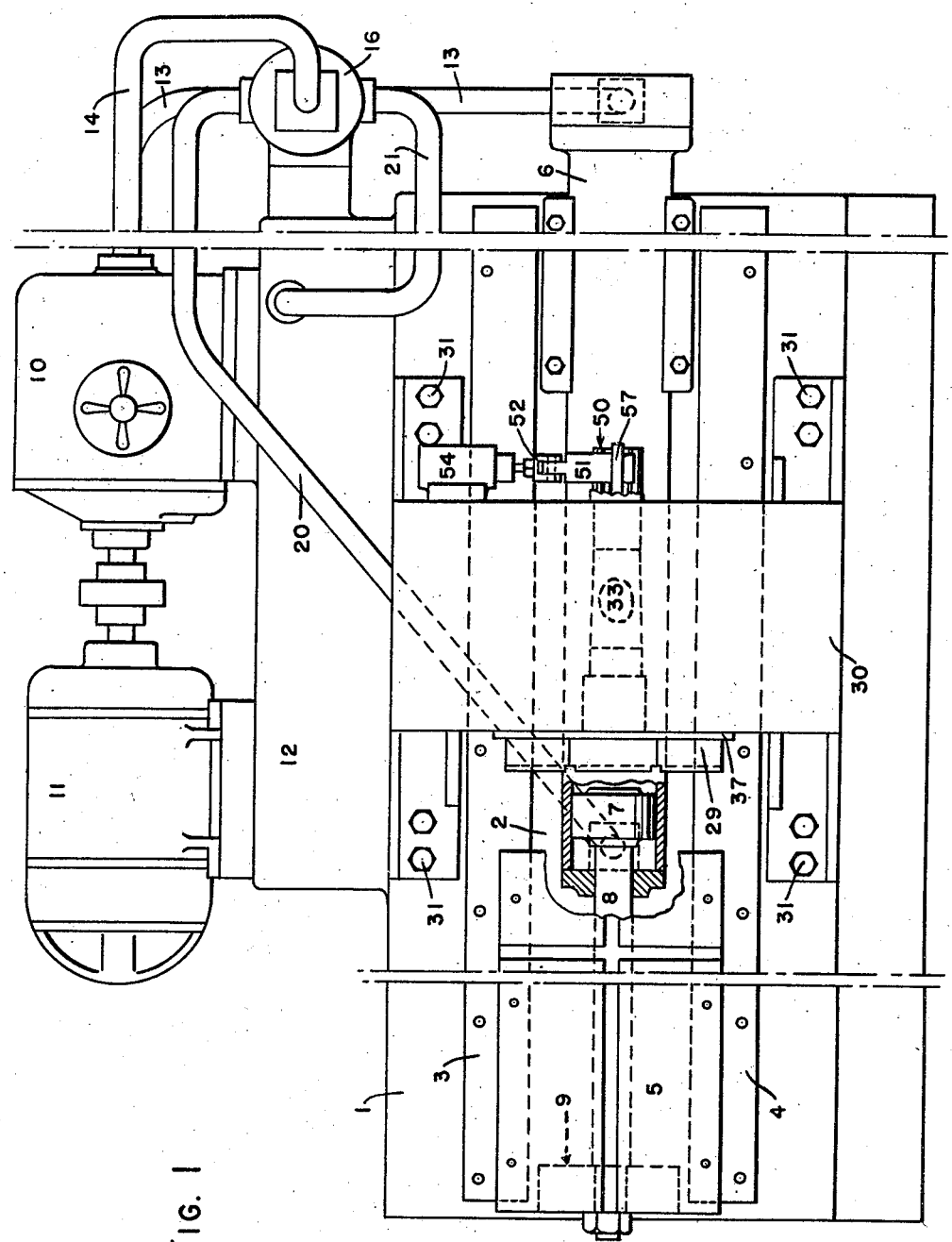
Fig. 1 is a front view of a broaching machine in which the invention is embodied, certain parts being broken away.

The machine chosen for illustration has its mechanism carried by a hollow frame 1 having a longitudinal recess 2 extending inward from the front thereof and two guide bars 3 and 4 rigidly secured thereto at opposite sides of recess 2 and overlapping the same.

Guide bars 3 and 4 slidably support a tool carriage 5 in such a manner that it is free to move longitudinally thereof but is prevented thereby from moving in any other direction. Carriage 5 is adapted to be reciprocated upon the guide bars by a hydraulic motor having its cylinder 6 arranged within recess 2 and rigidly secured to frame 1 and its piston 7 fitted in cylinder 6 and connected by a rod 8 to a flange 9 fixed to or formed integral with carriage 5 at the left end thereof.

Liquid for operating motor 6—7 may be supplied thereto from any suitable source such as a reversible pump 10 which is driven by an electric motor 11 and mounted therewith upon a reservoir 12 carried by frame 1 upon the top thereof. For the purpose of illustration, pump 10 has been indicated as being of the well known DX type shown schematically in Patent No. 2,274,191 and as being controlled by two solenoids C5 and C7. Energizing solenoid C7 or C5 causes pump 10 to discharge liquid into a channel 13 or a channel 14 respectively, pump 10 being adjustable to vary the rate at which it discharges liquid into either channel. When solenoids C5 and C7 are both deenergized, pump 10 will automatically reduce its displacement to zero and no liquid will be delivered thereby.

Channel 13 is connected to the head end of cylinder 6 and also to a port 15 formed in the casing of a differential valve 16 which has three other ports 17, 18 and 19 formed therein. Port 17 has channel 14 connected thereto, port 18 is connected by a channel 20 to the rod end of cylinder 6 and port 19 is connected by a channel 21 and a low pressure resistance valve 22 to reservoir 12.

Communication between the several ports of differential valve 16 is controlled by a valve member 23 which is fitted in the valve casing and provided with an internal passage 24 which extends longitudinally inward from the right end thereof and then extends radially outward at such a point that it will register with port 19 when valve member 23 is in its extreme right hand position as shown in Fig. 5.

The arrangement is such that, when pump 10 discharges liquid into channel 14, the liquid will first shift valve member 23 to the position shown in Fig. 5 and then it will flow through differential valve 16 and channel 20 to the rod end of cylinder 6 and cause piston 7 to advance tool carriage 5 on a working stroke. A part of the liquid expelled from cylinder 6 by piston 7 will flow through channel 13 directly to pump 10 and the remainder of the liquid will flow from channel 13 through port 15, passage 24 and port 19 of differential valve 16 and then flow through channel 21 and resistance valve 22 into reservoir 12.

Valve 22 will resist the discharge of liquid therethrough and thereby cause pump 10 to be supercharged. When pump 10 discharges liquid into channel 13, the liquid will shift differential valve member 23 to the position shown in Fig. 4 and then it will flow through channel 13 to the head end of cylinder 6 and cause piston to retract tool carriage 5. The liquid expelled from cylinder 6 by piston 7 will flow through channel 20 and differential valve 16 into channel 13 so that carriage 5 is retracted at high speed by liquid acting upon the differential area of piston 7. During retraction of carriage 5, pump 10 will draw its supply of liquid from reservoir 12 as shown and explained in Patent No. 2,274,191.

Tool carriage 5 is adapted to carry one or more broaching tools (not shown) for operating upon work carried by an indexible table 29 which is rotatably supported by a work support or sub-frame 30 rigidly secured to frame 1 outward from guide bars 3 and 4. Sub-frame 30 forms in effect a part of frame 1 and may be formed integral therewith but for manufacturing reasons it is preferably attached thereto as by means of a plurality of bolts 31.

Table 29 is adapted to make a quarter-revolution alternately with the movement of tool carriage 5 in each direction. During the first and third quarter-revolutions it moves work into position to be broached and during the second and fourth quarter-revolutions it moves the broached work out of broaching position so that the teeth of the broaching tool will not drag across the broached surface during retraction of carriage 5.

The work is ordinarily clamped in suitable work holding fixtures (not shown) which are rigidly secured upon the face of table 29 as by being bolted thereto. The machine stops with table 29 in the position shown in Fig. 2 and the work holding fixtures are arranged upon the upper portion A and the lower portion B thereof so that the work will be indexed into the path of the tool during the first and third quarter-revolutions of table 29. In order that the fixtures may be properly located upon table 29 and prevented from being shifted out of position by the lateral component of the broaching force which tends to move the work and the fixture away from the broaching tool, table 29 may be provided with a plurality of slots 32 by means of which the fixtures may be keyed to table 29.

As shown somewhat schematically in Fig. 3, table 29 is fixed upon the left end of a shaft 33 which is journaled in suitable bearings 34 and 35 carried by sub-frame 30. Bearings 34 and 35 may be of any suitable type but in order to simplify the view, they have been shown as being formed directly in sub-frame 30. A thrust collar 36 fixed upon shaft 33 in engagement with the right face of bearing 34 prevents shaft 33 from moving toward the left and holds table 29 in contact with a suitable wear plate 37 which is arranged upon the left face of sub-frame 30.

Table 29 is adapted to be locked in any one of four positions by a plunger 38 which is guided in the front wall of sub-frame 30 and has its end portion tapered and adapted to be inserted in any one of four complementary tapered holes 39, 40, 41 and 42 which are formed in table 29 and spaced 90° apart.

Plunger 38 is connected to one of the two tail rods of a piston 43 which is fitted in a cylinder 44 and adapted to move plunger 38 into and out of locking position. Cylinder 44 is arranged within and carried by sub-frame 30 which has suitable openings formed therein and portions thereof removable to provide for the installation of and access to the mechanisms arranged therein.

In order that table 29 may be rotated, shaft 33 has a pinion 50 fixed to or formed upon its right end and adapted to mesh with rack 51 which is pivoted at its upper end to a bracket 52 attached to the rod of a piston 53 fitted in a cylinder 54 which is arranged within and fixed to sub-frame 30. In order that rack 51 may be moved downward without effecting rotation of table 29, it is normally urged out of mesh with pinion 50 in any suitable manner such as by means of a compression spring 55 arranged between the lower face of bracket 52 and an arm 56 fixed to or formed integral with rack 51 near the upper end thereof.

Rack 51 is adapted to be moved into mesh with pinion 50 by a cam 57 which is guided by sub-frame 30 and connected to the other tail rod of piston 43 so that cam 57 and plunger 38 are moved simultaneously. Motion is transmitted from cam 57 to rack 51 by a slidable block 58 which is so guided by sub-frame 30 that it is free to move transversely thereof but is prevented from moving in other directions. A part of the guiding means has been omitted from Fig. 3 in order to expose rack 51 and pinion 50.

Figure 4:
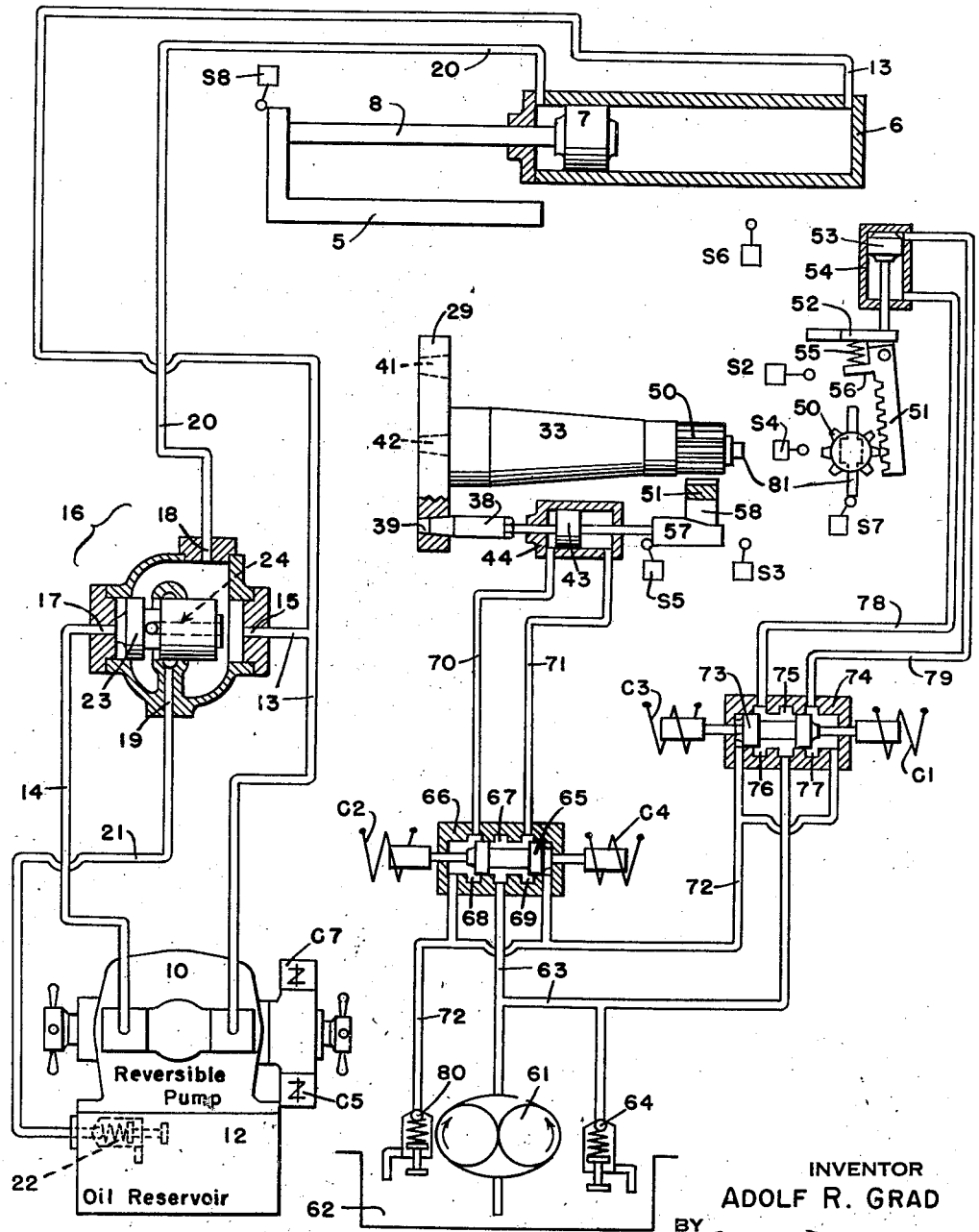
Fig. 4 is a diagram of the hydraulic circuit of the machine.

Liquid for operating servo-motors 43—44 and 53—54 is supplied by a gear pump 61 which is ordinarily driven in unison with pump 10 and arranged in the casing thereof according to the usual practice but which for the purpose of illustration has been shown in Fig. 4 as being separate therefrom and as drawing liquid from a separate reservoir 62. Gear pump 61 discharges liquid into a branched supply channel 63 having connected thereto a low pressure relief valve 64 through which liquid discharged by gear pump 61 in excess of requirements is exhausted and which enables gear pump 61 to maintain a predetermined pressure in channel 63.

Operation of motor 43—44 is controlled by a valve 65 fitted in a casing 66 having three annular grooves or ports 67, 68 and 69 formed in the wall thereof. Port 67 has a branch of supply channel 63 connected thereto, ports 68 and 69 are connected, respectively, by channels 70 and 71 to opposite ends of cylinder 44, and both ends of valve casing 66 are connected to a drain channel 72 which discharges into reservoir 62.

Operation of motor 53—54 is controlled by a valve 73 fitted in a casing 74 having three annular grooves or ports 75, 76 and 77 formed in the wall thereof. Port 75 has a branch of supply channel 63 connected thereto. Ports 76 and 77 are connected, respectively, by channels 78 and 79 to opposite ends of cylinder 53, and both ends of valve casing 74 has drain channel 72 connected thereto. Drain channel 72 discharges through a resistance valve 80 which has sufficient resistance to the discharge of liquid therethrough to prevent piston 53 from moving downward when the machine is idle.

The machine is adapted upon being manually started to perform an indexing cycle in which rack 51 is first moved downward on an idle stroke, then plunger 38 is retracted to unlock table 29 and cam 57 is advanced to move rack 51 into mesh with pinion 50, then rack 51 is moved upward and rotates table 29 a quarter-revolution, and then plunger 38 is advanced to lock table 29 in its new position and cam 57 is retracted to permit spring 55 to swing rack 51 out of mesh with pinion 50.

At the end of the indexing cycle, tool carriage 5 is automatically advanced on a working stroke at the end of which a second indexing cycle is performed and then tool carriage 5 is retracted to its initial position, thereby completing a full cycle of operations.

Any suitable control may be employed to effect the above cycle of operations but, since an electric control is ordinarily desired, valve 73 has been shown as being adapted to be shifted in one direction or the other by one or the other of two solenoids C1 and C3 (Fig. 4) and valve 65 has been shown as being adapted to be shifted in one direction or the other by one or the other of two solenoids C2 and C4. The numerals included in the reference characters applied to the solenoids for operating valves 65 and 75 and the solenoids for adjusting pump 10 designate the order in which the solenoids are first energized during a cycle of operations of the machine.

Solenoids C1, C2, C3, C4, C5 and C7 are energized in response to the operation of magnetic switches or relays R1, R2, R3, R4, R5 and R7, respectively, and those relays are operated in response to the closing in their proper order of a manually operable starting switch S1 and machine operated limit switch S2, S3, S4, S5 and S7, respectively. That is, each solenoid has associated therewith a relay and a switch bearing the same numeral as the solenoid. For example, closing starting switch S1 causes relay R1 to operate and cause solenoid C1 to be energized. The second indexing cycle in a complete cycle of operations is initiated by a relay R6 which is operated in response to operation of a machine operated limit switch S6.

Figure 9:
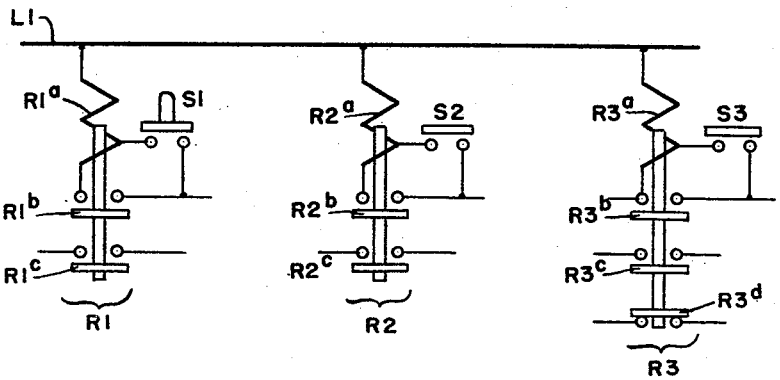
Figs. 9 and 10 are diagrams of the contactor switches or relays employed in the electric circuit.
Figure 10:
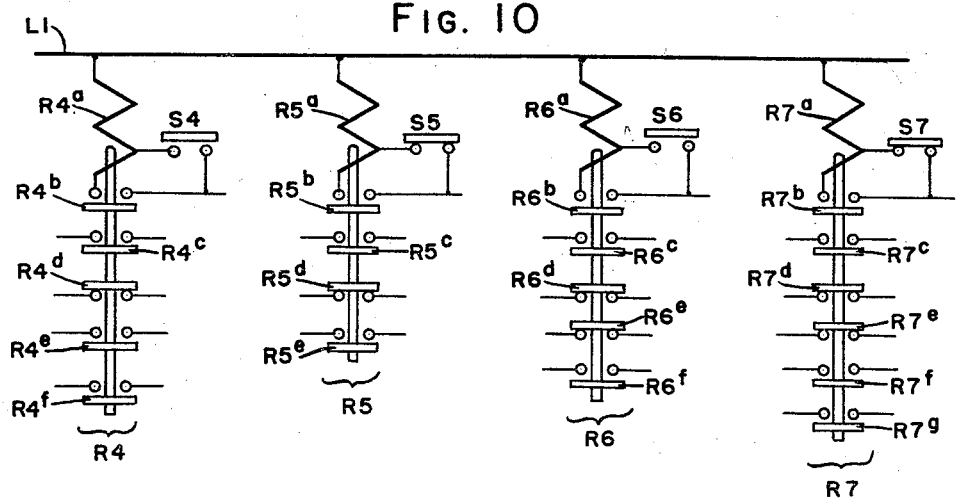

As shown schematically in Figs. 9 and 10, each relay includes a magnet and a plurality of switches which have been designated by the reference character of the relay with the letters $a$, $b$, $c$, etc., added thereto as exponents. Energizing the magnet causes the relay to rise and close the normally open switches and also open the normally closed switches if any. For example, relay R1 has a magnet $R1^a$ and two switches $R1^b$ and $R1^c$. Energizing magnet $R1^a$ causes the relay to rise and switches $R1^b$ and $R1^c$ to close.

Figure 8:
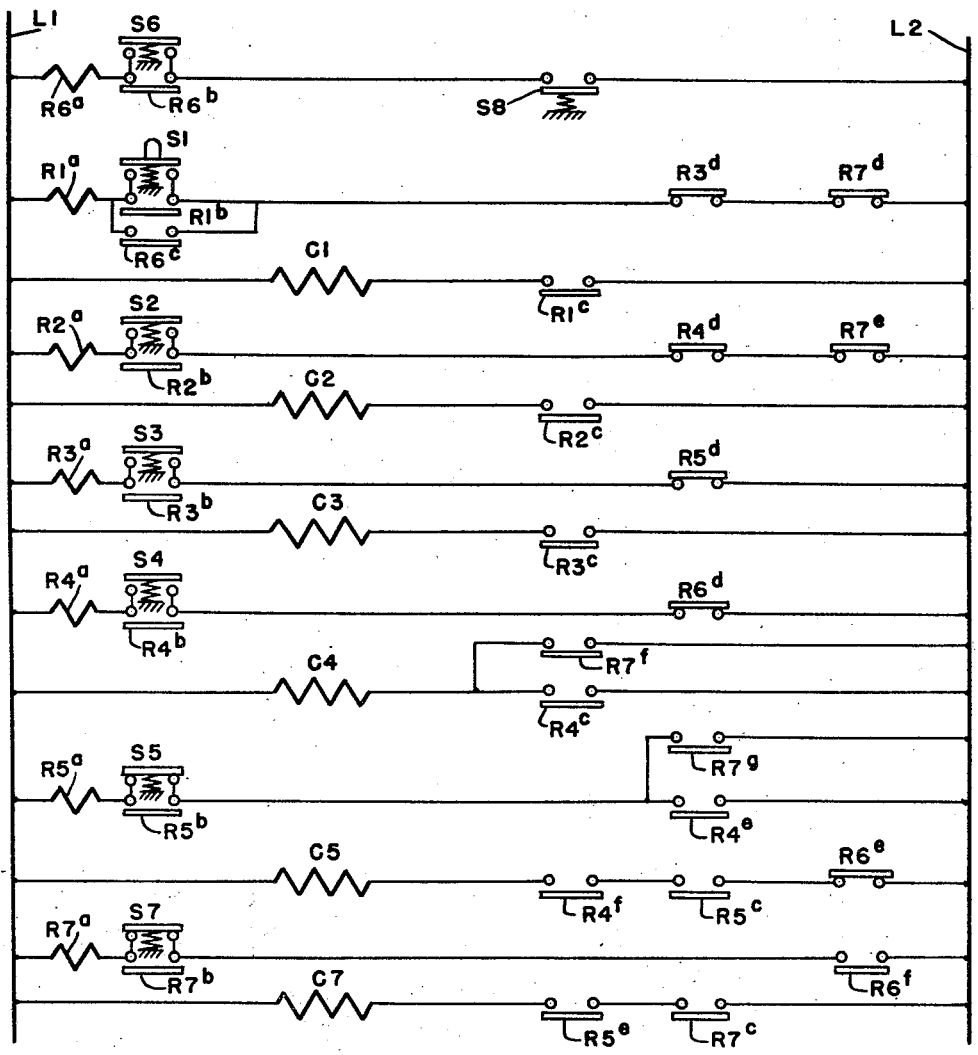
Fig. 8 is an across-the-line diagram of the electric circuit for controlling the machine.

Since an electric circuit in which the complete relays were shown connected to the solenoids and switches would be quite complicated, the electric circuit has been shown in Fig. 8 as a simple across-the-line diagram in which the magnets and switches of the relays are shown separately. For example, the second line on Fig. 8 shows that closing starting switch S1 establishes a circuit to energize magnet $R1^a$ and that the resultant closing of switch $R1^b$ establishes a holding circuit to keep magnet $R1^a$ energized when switch S1 opens. The third line on Fig. 8 shows that closing switch $R1^c$ establishes a circuit to energize solenoid C1.

Switches S1, S2, S3, S4, S6 and S7 are normally open. That is, they are spring biased to open position. Switch S2 is closed in response to rack 51 reaching the end of its down stroke and it has been shown as being operated by bracket 52. Switch S3 is closed in response to locking plunger 38 being fully retracted and rack 51 being meshed with pinion 50. Switch S5 is closed in response to plunger 38 reaching its locking position and rack 51 being moved out of mesh with pinion 50. For the purpose of illustration, switches S3 and S5 have been shown as being operated by cam 57 at opposite ends of its stroke. Switch S5 is held closed at the beginning of a cycle of operations but it cannot establish a circuit at that time as switches $R4^e$ and $R7^g$ are then open.

Switch S4 is closed at the completion of the first and third quarter-revolutions of table 29 and switch S7 is closed at the completion of the second and fourth quarter-revolutions of table 29 such as by means of suitable actuators (not shown) carried by table 29. In order to simplify the view, switches S4 and S7 have been shown in Fig. 4 as being operated by an actuator 81 arranged upon the end of pinion 50. Switch S7 is held closed at the beginning of a cycle of operations but it cannot establish a circuit at that time as switch $R6^f$ is then open. Switch S6 is operated in response to tool carriage 5 reaching the end of its working stroke. The circuit also includes a normally closed limit switch S8 which is opened in response to carriage 5 reaching the end of its return stroke. For the purpose of illustration, switches S6 and S8 have been shown as being operated directly by carriage 5.

In addition to the switches shown, the electric circuit includes a safety switch by means of which the machine may be stopped at any stage in a cycle of operations and other switches by means of which operation of parts of the machine may be effected independently of operation of the other parts but, since such switches and their connections are well known, they have been omitted from the drawings in order to avoid complicating the circuit diagram.

Operation

With the parts in the positions shown and the pumps running, the machine is idle, pump 10 is at zero stroke and pump 61 is discharging its entire output through relief valve 64 and is maintaining pressure in channel 63. Assuming that a broaching tool has been rigidly secured to carriage 5, the machine will operate as follows:

The operator will first clamp a work piece in the fixture on portion A of table 29 and then close switch S1 to start the machine. While the machine is performing a cycle of operations, the operator will remove the finished work piece, if any, from the fixture on portion B of table 29 and clamp a new work piece therein. Work pieces may be readily clamped in and removed from the fixture for the reason that table 29 is at a convenient loading height above the floor on which the machine is supported.

Closing starting switch S1 (Fig. 8) establishes a circuit to energize magnet $R1^a$ which will raise relay R1 to close switches $R1^b$ and $R1^c$. Switch $R1^b$ will establish a holding circuit for magnet $R1^a$. Switch $R1^c$ will establish a circuit to energize solenoid C1 which will shift valve 75 to the position shown in Fig. 7 and then gear pump liquid will flow through channel 63 (Fig. 4), valve casing 74 and channel 79 to the upper end of cylinder 54 and cause piston 53 to move rack 51 downward on an idle stroke.

At the end of the down stroke of rack 51, switch S2 will be closed and establish a circuit to energize magnet $R2^a$ which will raise relay R2 to close switches $R2^b$ and $R2^c$. Swith $R2^b$ will establish a holding circuit for magnet $R2^a$. Switch $R2^c$ will establish a circuit to energize solenoid C2 which will shift valve 65 to the position shown in Fig. 6 and then gear pump liquid will flow through channel 63, valve casing 66 and channel 70 to the left end of cylinder 44 and cause piston 43 to move plunger 38 and cam 57 toward the right to unlock table 29 and to swing rack 51 into mesh with pinion 50, thereby causing switch S5 to open and switch S3 to close.

Closing switch S3 establishes a circuit to energize magnet R3ᵃ which will raise relay R3 to close switches R3ᵇ and R3ᶜ and to open switch R3ᵈ. Opening switch R3ᵈ breaks the holding circuit for relay R1 which drops and breaks the circuit for solenoid C1 to deenergize the same. Closing switch R3ᵇ establishes a holding circuit to keep magnet R3ᵃ energized when the switch S3 opens. Closing switch R3ᶜ establishes a circuit to energize solenoid C3 which will shift valve 73 toward the left to the position shown in Fig. 4 and then gear pump liquid will flow from channel 63 through valve casing 74 and channel 78 to the lower end of cylinder 54 and cause piston 53 to move rack 51 upward to its initial position, thereby permitting switch S2 to open which has no effect as magnet R2ᵃ is kept energized by its holding circuit.

Since rack 51 is at this time in mesh with pinion 50, moving it upward will cause rotation of shaft 33 and table 29. The movement of rack 51 in each direction is positively limited, as by piston 53 engaging the ends of cylinder 54, and the stroke of rack 51 is of such length that it effects rotation of table 29 through exactly 90°, thereby bringing the work on portion A of table 29 into position to be broached by the tool on carriage 5 and bringing hole 40 into alignment with plunger 38.

Switch S7 opens as soon as table 29 starts to rotate and switch S4 is closed in response to table 29 completing the quarter-revolution. Opening switch S7 has no effect but closing switch S4 establishes a circuit to energize magnet R4ᵃ which will raise relay R4 to close switches R4ᵇ, R4ᶜ, R4ᵉ and R4ᶠ and to open switch R4ᵈ.

Opening switch R4ᵈ breaks the holding circuit for relay R2 which drops and its switch R2ᶜ opens and deenergizes solenoid C2. Closing switch R4ᵇ establishes a holding circuit to keep magnet R4ᵃ energized. Closing switches R4ᵉ and R4ᶠ has no effect at this time. Closing switch R4ᶜ establishes a circuit to energize solenoid C4 which will shift valve 65 toward the right to the position shown in Fig. 4 and then gear pump liquid will flow from channel 63 through valve casing 66 and channel 71 to the right end of cylinder 44 and move piston 43 toward the left. Piston 43 will move cam 57 toward the left, to permit spring 55 to swing rack 51 out of mesh with pinion 50, and it will force plunger 38 into hole 40 to lock table 29 in the position to which it was indexed.

Switch S3 opens when piston 43 starts to move and switch S5 closes when piston 43 completes its movement. Opening switch S3 has no effect at this time but closing switch S5 establishes a circuit to energize magnet R5ᵃ which will raise relay R5 to close switches R5ᵇ, R5ᶜ and R5ᵉ and to open switch R5ᵈ. Closing switch R5ᵉ has no effect at this time. Closing switch R5ᵇ establishes a holding circuit for magnet R5ᵃ. Opening switch R5ᵈ breaks the holding circuit for relay R3 which drops and deenergizes solenoid C3. Closing switch R5ᶜ establishes a circuit to energize solenoid C5 which will cause pump 10 to discharge liquid into channel 14. This liquid flows to the rod end of cylinder 6 and causes piston 7 to advance carriage 5 on a working stroke as previously explained.

Advancing carriage 5 permits switch S8 to close (which has no effect at this time) and enables the tool carried by carriage 5 to broach the work fastened to the portion A of table 29. The working stroke continues until the tool has passed beyond the work and then switch S6 is closed and establishes a circuit to energize magnet R6ᵃ which will raise relay R6 to close switches R6ᵇ, R6ᶜ and R6ᶠ and to open switches R6ᵈ and R6ᵉ.

Closing switch R6ᵇ establishes a holding circuit for magnet R6ᵃ. Opening switch R6ᵉ deenergizes solenoid C5 which permits pump 10 to go to zero stroke so that motor 6—7 is deenergized. Opening switch R6ᵈ breaks the holding circuit for relay R4 which drops and deenergizes solenoid C4 and it also breaks the holding circuit of relay R5 which drops. Closing switch R6ᶠ has no immediate effect. Closing switch R6ᶜ establishes a circuit to energize magnet R1ᵃ which will raise relay R1 to close switches R1ᵇ and R1ᶜ.

Switch R1ᵇ will establish a holding circuit for magnet R1ᵃ. Switch R1ᶜ will establish a circuit to energize solenoid C1 which will shift valve 73 to the position shown in Fig. 7 and thereby cause motor 53—54 to move rack 51 downward on an idle stroke and switch S2 to close as previously explained.

Closing switch S2 will establish a circuit to energize magnet R2ᵃ which will raise relay R2 and thereby cause solenoid C2 to be energized and shift valve 65 to the position shown in Fig. 6 so that gear pump liquid can energize motor 43—44 which will unlock table 29, mesh rack 51 with pinion 50, cause switch S5 to open and cause switch S3 to close as previously explained.

Closing switch S3 causes relay R3 to rise and cause solenoid C3 to be energized and relay R1 to drop and deenergize solenoid C1 as previously explained. Solenoid C3 will shift valve 73 to the position shown in Fig. 4 so that gear pump liquid can energize motor 53—54 which will move rack 51 upward, thereby permitting switch S2 to open and causing table 29 to be rotated 90° to move the work on portion A thereof out of the path of the broaching tool as previously explained.

Switch S4 opens as soon as table 29 starts to rotate and switch S7 is closed in response to table 29 completing the quarter-revolution. Opening switch S4 has no effect but closing switch S7 establishes a circuit to energize magnet R7ᵃ which will raise relay R7 to close switches R7ᵇ, R7ᶜ, R7ᶠ and R7ᵍ and to open switches R7ᵈ and R7ᵉ.

Opening switch R7ᵈ has no effect but opening switch R7ᵉ breaks the holding circuit for relay R2 which drops and deenergizes the solenoid C2. Closing switches R7ᶜ and R7ᵍ has no immediate effect. Closing switch R7ᵇ establishes a holding circuit for magnet R7ᵃ. Closing switch R7ᶠ establishes a circuit to energize solenoid C4 which will shift valve 65 to the position shown in Fig. 4 to permit gear pump liquid to energize motor 43—44 which will lock table 29, move cam 57 toward the left to permit spring 55 to swing rack 51 out of mesh with pinion 50, cause switch S3 to open and cause switch S5 to close as previously explained.

Closing switch S5 establishes a circuit to energize magnet R5ᵃ which will raise relay R5 to close switches R5ᵇ, R5ᶜ, and R5ᵉ and to open switch R5ᵈ. Closing switch R5ᶜ has no effect at this time. Closing switch R5ᵇ establishes a holding circuit for magnet R5ᵃ. Opening switch R5ᵈ breaks the holding circuit for relay R3 which drops and deenergizes solenoid C3. Closing switch R5ᵉ establishes a circuit to energize solenoid C7 which will cause pump 10 to discharge liquid into channel 13 and thereby cause motor 6—7 to retract carriage 5 at high speed as previously explained.

Switch S6 opens as soon as carriage 5 starts to retract and switch S8 is opened when carriage 5 is fully retracted. Opening switch S6 has no immediate effect but opening switch S8 breaks the holding circuit for relay R6 which drops to open switches R6$^b$, R6$^c$ and R6$^f$ and to close switches R6$^d$ and R6$^e$. Operating switches R6$^b$, R6$^c$, R6$^d$ and R6$^e$ has no effect but opening switch R6$^f$ breaks the holding circuit for relay R7 which drops to open switches R7$^b$, R7$^c$, R7$^f$ and R7$^g$ and to close switches R7$^d$ and R7$^e$. Operating switches R7$^b$, R7$^d$ and R7$^e$ has no effect. Opening switch R7$^f$ deenergizes solenoid C4. Opening switch R7$^c$ deenergizes solenoid C7 and permits pump 10 to go to zero stroke. Opening switch R7$^g$ permits relay R5 to drop which has no effect. The machine then stops with the parts in their initial positions so that another cycle of operations may be initiated by closing starting switch S1 which ordinarily may be closed immediately as there is usually ample time for the operator to remove a finished work piece from one fixture and to clamp a new work piece therein while the machine is operating upon the work piece in the other fixture.

Figure 11:
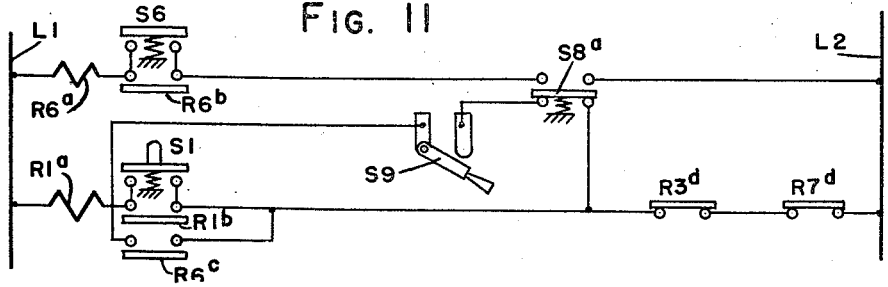
Fig. 11 is a modification of a part of the circuit shown in Fig. 8.

If full automatic operation of the machine were desired, it would simply be necessary to substitute a double throw limit switch S8$^a$ for the single throw limit switch S8 and to connect the normally open contacts of switch S8$^a$ in parallel with starting switch S1 as shown in Fig. 11. Then when carriage 5 reached the end of its retraction stroke, it would operate switch S8$^a$ to establish a circuit to cause relay R1 to rise and initiate a cycle of operations in the same manner as when starting switch S1 is closed. If a selection between full automatic and semi-automatic operation of the machine were desired, it would only be necessary to connect a manually operable switch S9 in series with the normally open contacts of switch S8$^a$ and then the machine would operate continuously until stopped by the operator if switch S9 were closed and it would perform a complete cycle of operations and stop if switch S9 were open.

The machine described herein is susceptible of various modifications and adaptations without departing from the scope of the invention which is hereby claimed as follows:

1. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means carried by said frame for reciprocating said carriage so that during movement of said carriage in one direction the broach takes a cut from the work and the force exerted by said power means is transmitted through the work to said table and thence through said sub-frame to said frame, and means for indexing said table through a predetermined angular distance alternately with the movements of said carriage.

2. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means for reciprocating said carriage to cause the broach thereon to take a cut from the work, said table bearing against a vertical face of said sub-frame so that the force exerted by said power means upon the work is transmitted through said sub-frame to said frame, means for indexing said table through a predetermined angular distance alternately with the movements of said carriage, and means responsive to the completion of an indexing movement for locking said table in a fixed position.

3. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means carried by said frame for reciprocating said carriage so that during movement of said carriage in one direction the broach takes a cut from the work and the force exerted by said power means is transmitted through the work to said table and thence through said sub-frame to said frame, and means for indexing said table through the same angular distance and in the same direction alternately with each movement of said carriage.

4. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means for reciprocating said carriage to cause the broach thereon to take a cut from the work, said table bearing against a vertical face of said sub-frame so that the force exerted by said power means upon the work is transmitted through said sub-frame to said frame, means for indexing said table through the same angular distance and in the same direction alternately with each movement of said carriage, and means responsive to the completion of an indexing movement for locking said table in a fixed position.

5. In a machine having a frame, a carriage guided by said frame and power means for reciprocating said carriage upon said frame, the combination of a sub-frame spaced from said carriage and fixed to said frame at opposite sides of the path of said carriage, a shaft journaled in said sub-frame with its axis parallel to the path of said carriage, a table fixed to said shaft and adapted to bear against said sub-frame, a pinion fixed to said shaft, a rack, means for moving said rack into and out of mesh with said pinion, and means operable alternately with the movements of said carriage for moving said rack in one direction while it is out of mesh with said pinion and for moving said rack through a predetermined angular distance in the opposite direction while it is in mesh with said pinion to thereby index said table through a predetermined angular distance in the same direction each time said rack moving means is operated.

6. In a machine having a frame, a carriage guided by said frame and power means for reciprocating said carriage upon said frame, the combination of a sub-frame spaced from said carriage and fixed to said frame at opposite sides of the path of said carriage, a shaft journaled in said sub-frame with its axis parallel to the path of said carriage, a table fixed to said shaft and adapted to bear against said sub-frame, a pinion fixed to said shaft, a rack, means for moving said rack into and out of mesh with said pinion, means operable alternately with the movements of said carriage for moving said rack in one direction while it is out of mesh with said pinion and for moving said rack through a predetermined angular distance in the opposite direction while it is in mesh with said pinion to thereby index said table through a predetermined angular distance in the same direction each time said rack moving means is operated, and means responsive to the completion of an indexing movement for locking said table in a fixed position.

7. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means carried by said frame for reciprocating said carriage so that during movement of said carriage in one direction the broach takes a cut from the work and the force exerted by said power means is transmitted through the work to said table and thence through said sub-frame to said frame, means for indexing said table in a given direction to a predetermined position, means responsive to the completion of an indexing movement for locking said table in said position, and means responsive to operation of said locking means for causing said power means to move said carriage in one direction.

8. In a machine having a frame, a carriage guided by said frame and power means for reciprocating said carriage upon said frame, the combination of a sub-frame spaced from said carriage and fixed to said frame at opposite sides of the path of said carriage, a table journaled in said sub-frame with its axis parallel to the path of said carriage and its periphery spaced from said carriage, means for indexing said table in a given direction to a predetermined position, means responsive to the completion of an indexing movement for locking said table in said position, means responsive to operation of said locking means for causing said power means to move said carriage in one direction, means operable at the end of the movement of said carriage for causing said locking means to unlock said table, means responsive to the unlocking of said table for causing said indexing means to index said table to a second position, means responsive to said table being indexed to said second position for causing said locking means to lock said table in said second position, and means responsive to the second locking of said table for causing said power means to move said carriage in the opposite direction.

9. In a broaching machine, the combination of a frame having considerable length relative to its height and spaced apart guides arranged one above the other upon its front face, a tool carriage guided by said guides and adapted to have a broach of substantial length fixed thereto to be moved thereby longitudinally of said frame, a sub-frame having its upper and lower portions fixed to said frame at opposite sides of said guides intermediate the ends thereof and its intermediate portion spaced from the path of said broach, a table supported by said sub-frame for rotation in a vertical plane and adapted to have work fixed thereto and extending into the path of said broach, power means carried by said frame for reciprocating said carriage so that during movement of said carriage in one direction the broach takes a cut from the work and the force exerted by said power means is transmitted through the work to said table and thence through said sub-frame to said frame, means for indexing said table in a given direction to a predetermined position, means operable in response to said table reaching said position for effecting operation of said power means to cause the same to advance said carriage, means operable in response to said carriage being fully advanced for effecting operation of said indexing means to cause the same to index said table in said given direction to a second predetermined position, and means operable in response to said table reaching said second position for effecting operation of said power means to cause the same to retract said carriage.

10. In a machine having a frame, a carriage guided by said frame and power means for reciprocating said carriage upon said frame, the combination of a sub-frame spaced from said carriage and fixed to said frame at opposite sides of the path of said carriage, a shaft journaled in said sub-frame with its axis parallel to the path of said carriage, a table fixed to said shaft and adapted to bear against said sub-frame, a lock for locking said table in selected positions, a pinion fixed to said shaft, a rack, means for moving said rack into and out of mesh with said pinion, a first servo-motor for reciprocating said rack, a second servo-motor for operating said lock and said rack meshing means simultaneously, and a control for causing said servo-motors and said power means to operate in a predetermined sequence.

11. In a machine having a frame, a carriage guided by said frame and power means for reciprocating said carriage upon said frame, the combination of a sub-frame spaced from said carriage and fixed to said frame at opposite sides of the path of said carriage, a shaft journalled in said sub-frame with its axis parallel to the path of said carriage, a table fixed to said shaft and adapted to bear against said sub-frame, a lock for locking said table in selected positions, a pinion fixed to said shaft, a rack, means for moving said rack into and out of mesh with said pinion, a first servo-motor for reciprocating said rack, a second servo-motor for operating said lock and said rack meshing means simultaneously, and a control including means for causing said first servo-motor to advance said rack, means responsive to said rack being fully advanced for causing said second servo-motor to unlock said table and mesh said rack with said pinion, means responsive to said rack being meshed for causing said first servo-motor to retract said rack and enable it to index said table, means responsive to said table being indexed for causing said second servo-motor to lock said table and unmesh said rack, and means responsive to said table being locked for causing said power means to advance said carriage.

12. In a machine having a frame, a carriage guided by said frame and power means for reciprocating said carriage upon said frame, the combination of a sub-frame spaced from said carriage and fixed to said frame at opposite sides of the path of said carriage, a shaft journaled in said sub-frame with its axis parallel to the path of said carriage, a table fixed to said shaft and adapted to bear against said sub-frame, a lock for locking said table in selected positions, a pinion fixed to said shaft, a rack, means for moving said rack into and out of mesh with said pinion, a first servo-motor for reciprocating said rack, a second servo-motor for operating said lock and said rack meshing means simultaneously, and a control including means for causing said first servo-motor to advance said rack, means responsive to said rack being fully advanced for causing said second servo-motor to unlock said table and mesh said rack with said pinion, means responsive to said rack being meshed for causing said first servo-motor to retract said rack and enable it to index said table, means responsive to said table being indexed for causing said second servo-motor to lock said table and unmesh said rack, thereby completing an indexing cycle, means responsive to said table being locked for causing said power means to advance said carriage, means responsive to said carriage being fully advanced for initiating a second indexing cycle, and means operable upon completion of said second indexing cycle for causing said power means to retract said carriage.

13. In a machine having a carriage for carrying a tool and power means for moving said carriage in opposite directions, the combination of a carriage for carrying work to be operated upon by said tool, means for indexing said work carriage, means for locking said work carriage in selected positions, and a control including means for causing said locking means to unlock said work carriage, means responsive to operation of said locking means for causing said indexing means to index said work carriage to move the work thereon into position to be operated upon by said tool, means responsive to operation of said indexing means for causing said locking means to lock said work carriage and thereby complete an indexing cycle, means responsive to operation of said locking means for causing said power means to move said tool carriage in a direction to enable said tool to operate upon said work, means responsive to operation of said power means for initiating a second indexing cycle, and means responsive to completion of said second indexing cycle for causing said power means to move said tool carriage in the opposite direction.

ADOLF R. GRAD.